(12) United States Patent
Dahlheimer

(10) Patent No.: US 7,926,400 B2
(45) Date of Patent: Apr. 19, 2011

(54) CUTTING ROTOR FOR GRANULATING PLASTIC CASTINGS

(75) Inventor: Stefan Dahlheimer, Kleinostheim (DE)

(73) Assignee: Rieter Automatik GmbH, Grossostheim (DE)

( * ) Notice: Subject to any disclaimer, the term of this patent is extended or adjusted under 35 U.S.C. 154(b) by 209 days.

(21) Appl. No.: 11/663,094

(22) PCT Filed: Sep. 16, 2005

(86) PCT No.: PCT/EP2005/010023
§ 371 (c)(1),
(2), (4) Date: May 19, 2007

(87) PCT Pub. No.: WO2006/042602
PCT Pub. Date: Apr. 27, 2006

(65) Prior Publication Data
US 2008/0000340 A1    Jan. 3, 2008

(30) Foreign Application Priority Data

Oct. 13, 2004   (DE) .......................... 10 2004 049 862

(51) Int. Cl.
*B26D 7/26* (2006.01)
*B29B 9/06* (2006.01)
*B29B 9/02* (2006.01)

(52) U.S. Cl. ........... 83/675; 83/592; 83/840; 83/698.41; 425/67; 425/313

(58) Field of Classification Search ............ 83/675–678, 83/840, 844, 663, 592, 674, 831, 839, 841–843; 425/67, 311, 313, 382 R, 464, DIG. 230
See application file for complete search history.

(56) References Cited

U.S. PATENT DOCUMENTS

| 3,735,661 | A | * | 5/1973 | Eichler et al. ................... 83/675 |
| 3,831,482 | A | * | 8/1974 | Eichler et al. ................... 83/675 |
| 4,123,207 | A | * | 10/1978 | Dudley ........................... 425/67 |
| 4,179,255 | A | | 12/1979 | Hale |
| 4,800,792 | A | * | 1/1989 | Bertolotti ..................... 83/356.3 |
| 4,936,516 | A | | 6/1990 | Hench et al. |
| 5,165,319 | A | * | 11/1992 | Snyder et al. ................... 83/840 |
| 5,191,819 | A | | 3/1993 | Hoshi et al. |
| 5,593,702 | A | * | 1/1997 | Harris et al. ..................... 425/67 |
| 5,599,562 | A | | 2/1997 | Harris et al. |
| 5,611,983 | A | | 3/1997 | Ma et al. |
| 5,613,538 | A | * | 3/1997 | Brisson ......................... 144/228 |
| 5,624,688 | A | * | 4/1997 | Adams et al. ................... 425/67 |
| 6,386,469 | B1 | | 5/2002 | Meister et al. |

(Continued)

FOREIGN PATENT DOCUMENTS

DE    74 06 951  U    2/1974

(Continued)

*Primary Examiner* — Laura M. Lee
(74) *Attorney, Agent, or Firm* — Birch, Stewart, Kolasch & Birch, LLP

(57) ABSTRACT

The invention relates to a rotary cutter for the pelletization of plastic extrudates, said rotary cutter being provided with knives projecting axially away from its end surface, said knives being individually affixed to supporting surfaces of the rotary cutter by means of fastening elements. The supporting surfaces are formed by the side walls of radial grooves in the peripheral surface of the rotary cutter and by radial transverse walls in the radial grooves, said radial grooves being limited by the radial transverse walls, the knives each being inserted in hook-like manner with a projecting portion into said radial transverse walls, wherein one side of the projecting portion forms an abutment for the fastening element, said fastening element penetrating a radial transverse wall and pressing on the abutment.

20 Claims, 3 Drawing Sheets

U.S. PATENT DOCUMENTS

| | | |
|---|---|---|
| 6,832,738 B2 | 12/2004 | Wessling et al. |
| 2004/0258784 A1 | 12/2004 | Muerb |

FOREIGN PATENT DOCUMENTS

| | | |
|---|---|---|
| DE | 29 09 862 A1 | 10/1979 |
| DE | 89 02 716.7 U1 | 6/1989 |
| DE | 691 23 494 T2 | 6/1997 |
| DE | 198 16 611 A1 | 10/1999 |
| DE | 198 55 617 A1 | 6/2000 |
| DE | 696 08 889 T2 | 11/2000 |
| DE | 100 62 113 C1 | 4/2002 |
| WO | WO-03/011547 A | 2/2003 |

* cited by examiner

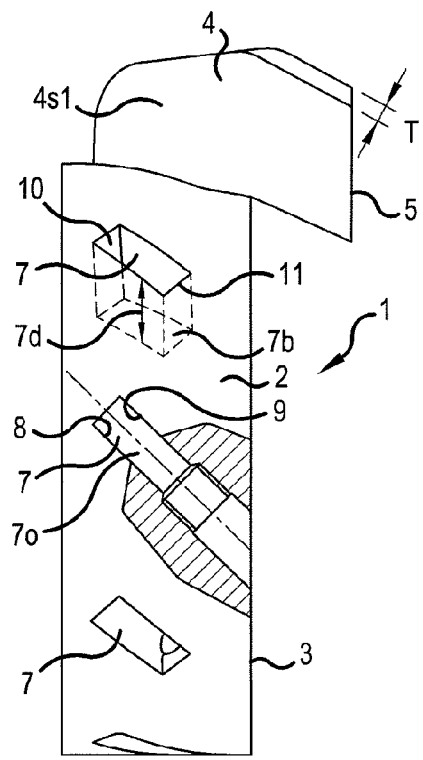
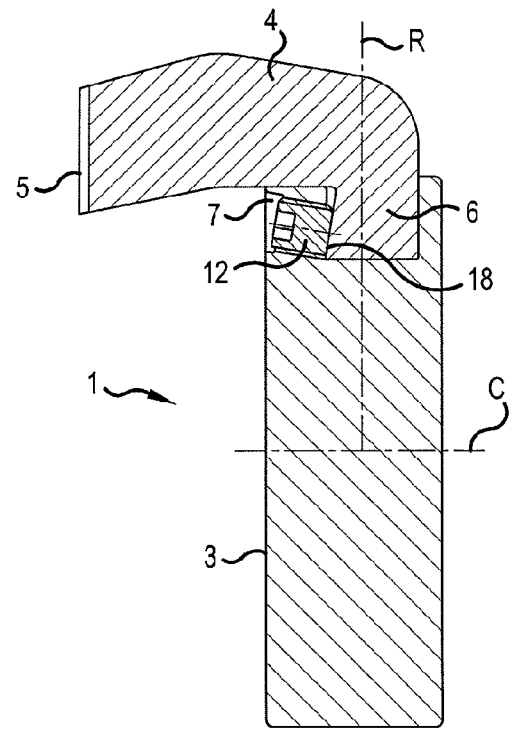
FIG.3            FIG.4
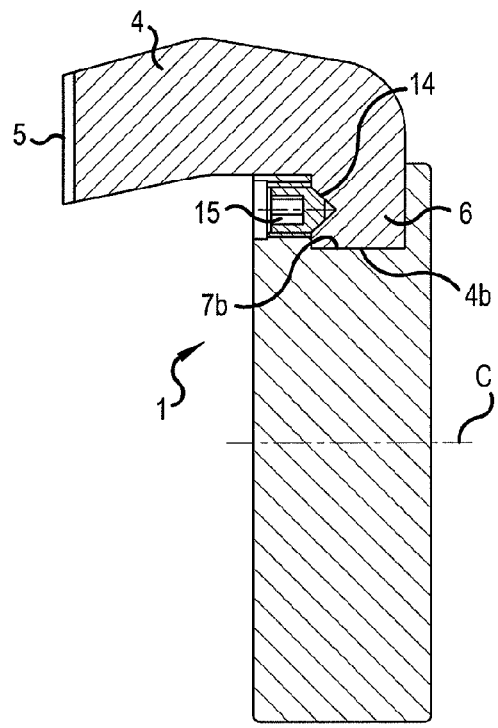
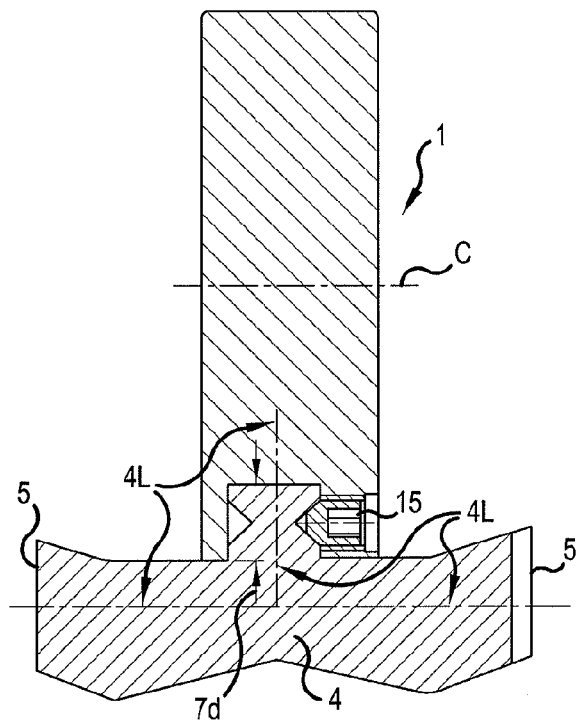
FIG.5            FIG.6

CUTTING ROTOR FOR GRANULATING PLASTIC CASTINGS

CROSS-REFERENCE TO RELATED APPLICATION

The present application claims priority under 35 U.S.C. §119 to German Patent Application No. DE 10 2004 049 862.8 (filed Oct. 13, 2004), and International Patent Application No. PCT EP 2005/010023 (filed Sep. 16, 2005), the entire contents of which are hereby incorporated by reference.

BACKGROUND OF THE INVENTION

1. Field of the Invention

The invention relates to a rotary cutter for the pelletization of plastic extrudates, said rotary cutter being provided with knives projecting axially away from its end surface, said knives being individually affixed to supporting surfaces of the rotary cutter by means of fastening elements.

2. Description of Prior Art

Such a rotary cutter is described and presented in U.S. Pat. No. 3,196,487. Said rotary cutter is used in an underwater pelletizer having a die plate with circularly disposed extrusion orifices, said extrusion orifices being skimmed over in circular motion by the knives of the rotary cutter, said knives widely projecting in the manner of blades. The rotary cutter rotates about a shaft extending through the centre of the circle along which are disposed the extrusion orifices in the die plate. As they move over the extrusion orifices, the knives cut the extruded plastic strands issuing in molten form from the extrusion orifices into individual pieces which form the desired pellets or granules. This cutting operation takes place under water, said water flowing over the die plate during rotation of the rotary cutter. Owing to their considerable length, the knives, which project in the manner of blades, tend to flutter somewhat, this having an adverse effect on the close contact between knives and die plate. However, constant close contact between the knives and the die plate is a prerequisite for the uniform cutting of the plastic strands.

In another known underwater pelletizer according to DE-PS 10062113, the knives supported by the rotary cutter are individually screwed onto supporting surfaces affixed to the rotary cutter and provide a more compact, flutter-free design. The supporting surfaces extend towards the die plate in the rotary cutter, for which purpose the rotary cutter is provided with supporting surfaces extending in identical direction. The individual knives are pressed onto said supporting surfaces by means of screws which serve as fastening elements, said screws penetrating the knives, with the heads of the screws protruding from the knives such as to be easily accessible for a tool. Provided between the individual knives and the individual supports, forming the supporting surfaces, on the rotary cutter are intermediate spaces through which the water and pellets are able to flow away in the axial direction. It has emerged that the screw heads, which protrude from the individual knives, are, firstly, not easily accessible on account of the oppositely positioned supports and, secondly, obstruct the passage of water and pellets as the latter flow past them.

SUMMARY AND OBJECTS OF THE INVENTION

The object of the invention is to improve the fastening of the knives to such a rotary cutter such that, firstly, there is good accessibility of the fastening elements which support the knives and that, secondly, said fastening elements do not obstruct the flow in the aforementioned intermediate spaces.

The object of the invention is achieved in that the supporting surfaces are formed by the side walls of radial grooves in the peripheral surface of the rotary cutter and by radial transverse walls in the radial grooves, said radial grooves being limited by the radial transverse walls, the knives each being inserted in hook-like manner with a projecting portion into said radial transverse walls, wherein one side of the projecting portion forms an abutment for the fastening element, said fastening element penetrating a radial transverse wall and pressing on the abutment.

On account of this hook-like manner of fastening of the individual knives and the insertion of the fastening elements through a radial transverse wall, said fastening elements, as seen from one end surface of the rotary cutter, are directly and easily accessible. They are disposed at a distance from the intermediate spaces between knives and supports and are therefore unable to obstruct the flow in said intermediate spaces. Furthermore, the hook-like design of the knives provides a high degree of security with regard to their position in relation to the rotary cutter, with the overall consequence that the rotary cutter according to the invention is of a flutter-free design which is particularly stable for operation.

In order to provide secure support for the knife, the side of the projecting portion facing the knife edge may extend at such an angle to the radial direction that the fastening element, pressing on the projecting portion and being in the form of a screw, exerts a force component such as to pull the projecting portion into the rotary cutter. However, it is also possible for the projecting portion to be provided with a notch, said notch being engaged by a correspondingly shaped end surface of the fastening element, said fastening element being in the form of a screw. Screws are preferably used as the fastening elements. In this case, it is advantageous for the screw head to be provided with a recess in the rotary cutter, the screw head being countersunk in the rotary cutter. The screw head is provided in conventional manner with a recess for receiving a turning tool. The fact that the screw head is accommodated in a recess in the rotary cutter has, above all, the advantage that the screw heads are unable to obstruct any cleaning operations. Preferably, the screws are disposed such that they penetrate into the rotary cutter from the side facing the knife edge. Said side is particularly well accessible for repair work. However, it is also possible for the screws to be provided in the opposite direction, i.e. such that they penetrate into the rotary cutter from the side facing away from the knife edge.

Further scope of applicability of the present invention will become apparent from the detailed description given hereinafter. However, it should be understood that the detailed description and specific examples, while indicating preferred embodiments of the invention, are given by way of illustration only, since various changed and modifications within the spirit and scope of the invention will become apparent to those skilled in the art from this detailed description.

BRIEF DESCRIPTION OF THE DRAWINGS

FIG. 3 shows a portion of the rotary cutter with some of the radial grooves unoccupied;

FIG. 4 shows a section through the rotary cutter in the region of an inserted knife;

FIG. 5 shows a variation on the design of the rotary cutter from FIG. 4, with a notched projecting portion;

FIG. 6 shows a further variation with double knife;

DETAILED DESCRIPTION OF THE PREFERRED EMBODIMENTS

Figure 1:
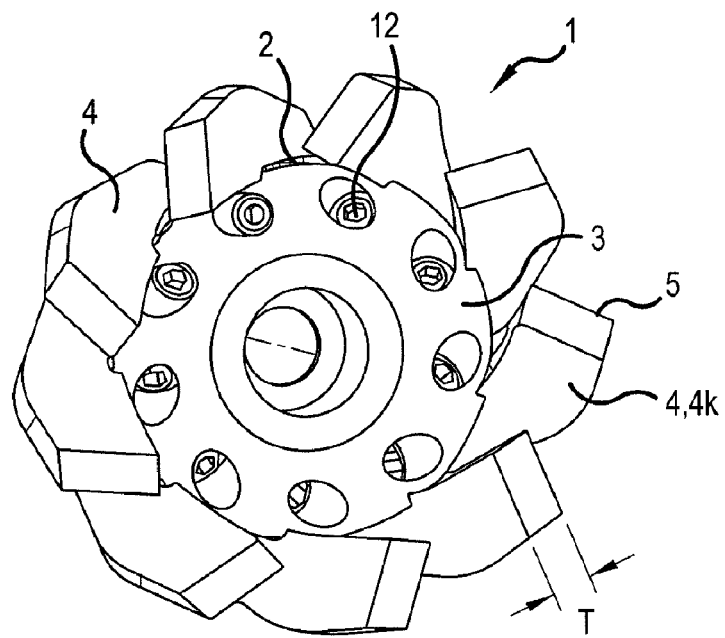
FIG. 1 shows the rotary cutter in a view onto its end surface with screws as fastening elements.

The rotary cutter 1 presented in FIG. 1 is provided on its peripheral surface 2 with the individual knives 4, the cutting edges 5 of which extend radially with respect to the central axis C of the rotary cutter 1 and thus contact a die plate (not shown), as presented, for example, in U.S. Pat. No. 3,196,487, wherein, as the rotary cutter 1 rotates with the knives 4, the extruded plastic strands are then pelletized in the above-described manner. The knives 4 are exchangeably fastened to the rotary cutter 1 by means of the fastening elements in the form of screws 12 (see, for example, FIG. 4). As is apparent from FIG. 1, the screws 12 are easily accessible from the end surface 3 of the rotary cutter 1, where they are unable to obstruct a flow in the intermediate spaces between the individual knives 4.

Figure 2:
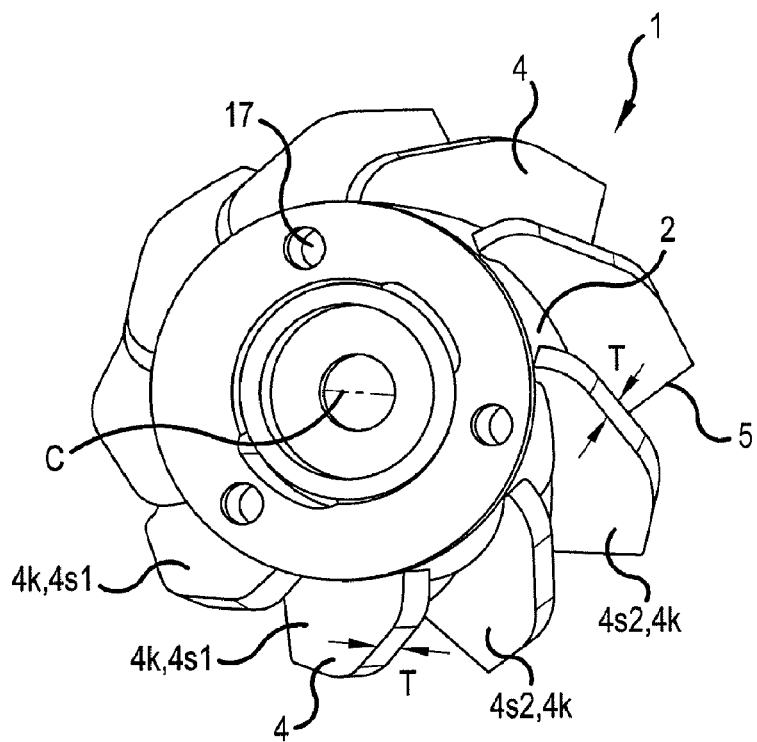
FIG. 2 shows the same rotary cutter in a view onto the rear side of the knives.

FIG. 2 shows the same rotary cutter 1 with the knives 4 which project from the peripheral surface 2 of the rotary cutter 1. The fastening of the knives 4 to the rotary cutter 1 is presented in FIGS. 4 to 7.

The rear side of the rotary cutter 1 presented in FIG. 2 has three receiving holes 17 which serve to fasten the rotary cutter 1 to a rotary shaft (not shown).

FIG. 3 presents a view of the rotary cutter looking perpendicularly onto the central axis C of the shaft thereof, said view showing the design of the radial grooves 7, some of which are without knives. As can be seen in FIGS. 1 and 3-6, the radial grooves 7 has an opening 7o which is substantially rectangular in shape and which opens in a radial direction R of the rotary cutter 1. As can be seen in FIG. 3, the rotary cutter 1 is provided in the region of its peripheral surface 2 with a plurality of radial grooves 7, of which the radial grooves 7 have been left unoccupied for the purpose of better representation of the design of the rotary cutter 1. Only one radial groove (not visible) is occupied by the knife 4. The radial grooves 7 are limited at the sides by the side walls 8 and 9 and also by the radial transverse walls 10 and 11. As can be seen in FIGS. 1-3, the side walls 8 and 9 and the transverse walls 10 and 11 of each of the radial grooves 7 formed on the peripheral surface 2 of the rotary cutter 1 have surfaces arranged at an angle that is neither parallel nor orthogonal to the end surface 3 of the rotary cutter. Thus, the radial groove 7 is substantially rectangular in shape. Consequently, the radial grooves 7 are of a length (i.e., have a depth 7d) which, except for a remaining gap, corresponds to the length of the projecting portions 6 (see FIGS. 4-6).

As can be seen in FIGS. 1-9, knives 4 have flat front and back side surfaces 4s1 and 4s2 which are parallel to each other. FIG. 4 presents a sectional view along the centre of the knives 4 from FIGS. 1 and 2 and shows how the individual knives 4 are fastened. The knives 4 are each provided with a projecting portion 6 which projects away in hook-like manner with respect to the portion 4k with a knife edge 5. As such, the projecting portion 6 and the portion 4k with the knife edge 5 form an L-shaped portion of the knife 4. The projecting portion 6 projects into the radial groove 7 in the rotary cutter 1 (see FIG. 3). The radial groove 7 is of a width between side walls 8 and 9 which corresponds, with a small tolerance, to the thickness T between front and back side surfaces 4s1, 4s2 of the knives 4, with the result that an inserted knife 4 is securely supported laterally on the side walls 8 and 9 of the radial groove 7. The knife 4 is secured by the screw 12 which is screwed into a corresponding penetration in the rotary cutter 1 and presses onto the abutment 18 on the projecting portion 6, thereby securely fastening the knife 4 to the rotary cutter 1. The side of the projecting portion 6 facing the knife edge 5 extends, as is clearly shown in FIG. 4, at such an angle to the radial direction that the screw, pressing on the projecting portion 6, subjects the projecting portion 6 to a force which pulls the projecting portion 6 into the rotary cutter 1, thereby guaranteeing the secure fastening of the projecting portion 6. Further, as can be seen in FIGS. 3-6, the bottom surface 4b of the projection portion 6 of the knife 4 rests on the bottom 7b of the groove and extends in a direction that is substantially orthogonal to the knife edge 5.

FIG. 5 presents a variation on the design shown in FIG. 4 in which the knife 4 is secured to the rotary cutter 1 by means of a notch 14 in the projecting portion 6, said notch 14 serving as an abutment 18. For this purpose, the screw 15 is provided on its end surface with a corresponding conical portion which fits into the notch 14 and, with the screw 15 tightened, secures the knife 4 to the rotary cutter 1.

As in the design shown in FIG. 4, also in the design shown in FIG. 5 the screw 15 is provided with a hexagonal recess into which it is possible to insert an appropriate key or wrench with which to tighten the screw 15.

FIG. 6 presents a variation on the design shown in FIG. 5 in which the knife 4 is double-edged. In other words, the knife 4 of FIG. 6 has two L-shaped portions 4L. This design has the advantage that, when one of its cutting edges 5 is worn, the knife 4 can simply be turned round by 180°, as a result of which a new cutting edge 5 comes into the region of the rotary cutter 1 which then performs the pelletizing operation.

Figure 7:
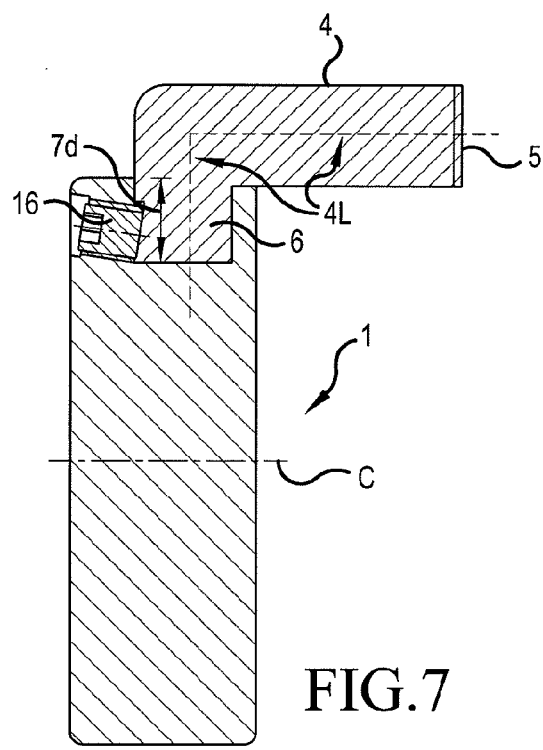
FIG. 7 shows a further variation with a screw from the rear side.

FIG. 7 shows a design which is essentially the same as that shown in FIG. 4, it merely being the case that the screw 16 presses against the projecting portion 6 from the side facing away from the knife edge 5, thereby securing the knife 4 to the rotary cutter 1.

It should also be pointed out that, in the methods of fastening presented in FIG. 4 to FIG. 7, the head of the screw in each case disappears into a countersink, said head being adapted to receive a turning tool. This has the advantage that, when it occasionally becomes necessary to clean off firmly adhering pelletized material from the rotary cutter 1, the scraping off of said material does not result in damage to and therefore breaking off of the screw head, which would then subsequently make it impossible to unscrew the screw.

Figure 8:
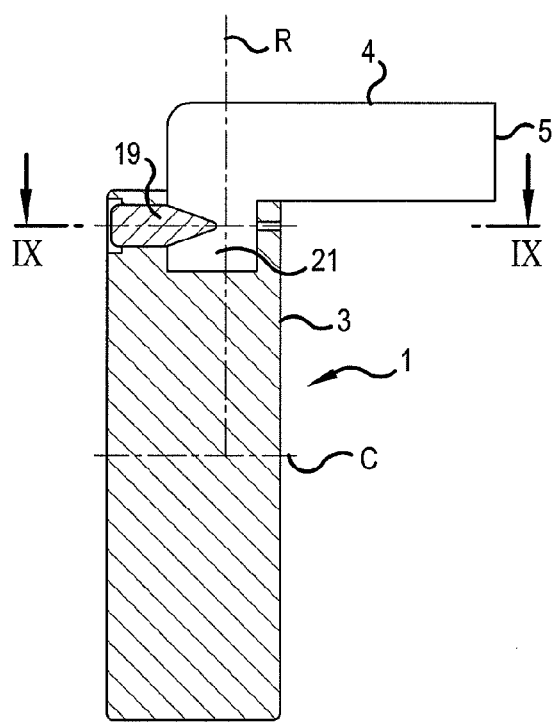
FIGS. 8 and 9 show a further variation with a wedge as fastening element.

In the illustrative embodiments shown in FIGS. 1-7, screws are used as the fastening elements for the knives. As initially indicated, however, it is also possible to employ alternative fastening elements. FIGS. 7 and 8 present an illustrative embodiment in which a wedge piece is used as the fastening element, FIG. 8 showing a radial section through the rotary cutter 1, wherein, in order to simplify the representation, only one knife has been inserted into the rotary cutter 1, while FIG. 9 shows a section along line IX-IX from FIG. 8.

Figure 9:
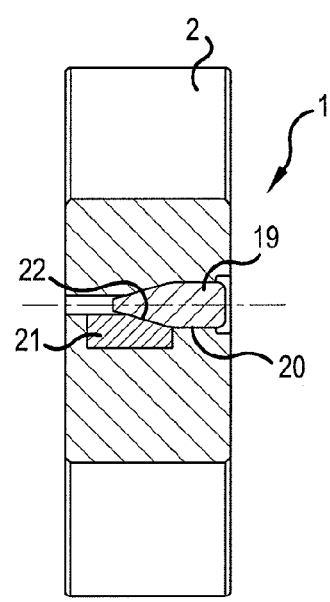

As shown in FIGS. 8 and 9, the wedge piece 19 penetrates into the rotary cutter 1, for which purpose the rotary cutter 1 is provided with a corresponding penetration 20 into which the wedge piece snugly fits with its rear cylindrical neck. With its front wedge-shaped portion, the wedge piece 19 presses laterally against the projecting portion 21, which projecting portion 21 is in this case provided on its side facing the wedge piece 19 with a corresponding beveled portion 22. On account of the friction between it and the beveled portion 22, the wedge piece 22 is securely held in its position as presented in FIGS. 8 and 9. It should also be pointed out that the use of a wedge piece may be provided from both sides of the rotary cutter 1, as was already presented in the above-described drawings in connection with the use of screws as fastening elements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotary cutter for pelletization of plastic extrudates,
    said rotary cutter being provided with hook-shaped knives projecting axially beyond an end surface thereof,
    said knives being individually affixed to supporting surfaces of the rotary cutter by means of fastening elements,
    wherein the rotary cutter has a circular peripheral surface,
    wherein each of the hook-shaped knives is a single monolithic member which includes an L-shaped portion formed by a portion with a knife edge and a projecting portion extending in a direction that is substantially orthogonal to the portion with the knife edge,
    the projecting portion having a length and a flat bottom surface which are substantially orthogonal to each other so that the knife edge extends in a direction parallel to the length of the projecting portion and substantially orthogonal to the flat bottom surface of the projecting portion,
    wherein the projecting portions of the knives are inserted, respectively, into radial grooves formed on a peripheral surface of the rotary cutter, and the knife edges extend in a direction parallel to the end surface of the rotary cutter,
    wherein each of the radial grooves includes two side walls which form said supporting surfaces on opposite sides of the groove, and the grooves being closed, respectively, at each end thereof by a pair of radial transverse walls,
    the two side walls and a first one of transverse walls of each groove substantially correspond to an outer shape of the projecting portion inserted therein, and
    wherein a second one of the radial transverse walls of each groove forms a counter support for the corresponding fastening element, and the first one of the radial transverse walls of each groove forms a counter support for the corresponding projecting portion inserted into the groove.

2. The rotary cutter according to claim 1,
    wherein each of the fastening elements is formed as a screw, and
    each of the projecting portions has a side facing the knife edge extending at such an angle to the radial direction that the corresponding fastening element presses on the corresponding projecting portion, and exerts a force component such as to pull the corresponding projecting portion into the rotary cutter.

3. The rotary cutter according to claim 1, wherein each of the fastening elements is formed as a screw, and
    each of the projecting portions is provided with a notch, said notch being engaged by a correspondingly shaped end surface of the corresponding fastening element.

4. The rotary cutter according to claim 2, wherein a head of each of the screws is provided with a recess for receiving a turning tool, and each of the screws is countersunk into a recess in the rotary cutter.

5. The rotary cutter according to claim 1, wherein each of the fastening elements is a wedge piece for jamming the corresponding projecting portion into the radial groove.

6. The rotary cutter according to claim 1, wherein each of the fastening elements penetrates into the rotary cutter from a side facing the corresponding knife edge.

7. The rotary cutter according to claim 1, wherein each of the fastening elements penetrates into the rotary cutter from a side facing away from the corresponding knife edge.

8. The rotary cutter according to claim 3, wherein a head of each of the screws is provided with a recess for receiving a turning tool, and each of the screws is countersunk into a recess in the rotary cutter.

9. The rotary cutter according to claim 2, wherein each of the fastening elements penetrates into the rotary cutter from a side facing the corresponding knife edge.

10. The rotary cutter according to claim 3, wherein each of the fastening elements penetrates into the rotary cutter from a side facing the corresponding knife edge.

11. The rotary cutter according to claim 4, wherein each of the fastening elements penetrates into the rotary cutter from a side facing the corresponding knife edge.

12. The rotary cutter according to claim 5, wherein each of the fastening elements penetrates into the rotary cutter from a side facing the corresponding knife edge.

13. The rotary cutter according to claim 2, wherein each of the fastening elements penetrates into the rotary cutter from a side facing away from the corresponding knife edge.

14. The rotary cutter according to claim 3, wherein each of the fastening elements penetrates into the rotary cutter from a side facing away from the corresponding knife edge.

15. The rotary cutter according to claim 4, wherein each of the fastening elements penetrates into the rotary cutter from a side facing away from the corresponding knife edge.

16. The rotary cutter according to claim 1, wherein each of the radial grooves is substantially rectangular in shape and includes a flat bottom which extends orthogonally to the sides walls and transverse walls of the groove.

17. The rotary cutter according to claim 1, wherein each of the radial grooves is substantially rectangular in shape and includes a flat bottom, and the bottom surface of each of the projecting portions rests against the flat bottom of the groove when the projecting portion is inserted into the groove.

18. The rotary cutter according to claim 1, wherein each of the radial grooves is substantially rectangular in shape and each of the side walls and transverse walls extends in a radial direction R of the rotary cutter.

19. The rotary cutter according to claim 1, wherein the two side walls of the projecting portion are parallel to each other, and
    each of the radial grooves has a width between the two side walls of the radial groove which corresponds, with a small tolerance, to a thickness T between front and back side surfaces of the knives which, so that an inserted knife is securely supported laterally between the two walls of the radial groove, with the flat bottom surface thereof resting on a flat bottom of the radial groove.

20. The rotary cutter according to claim 1, wherein the side walls and the transverse walls of each of the radial grooves formed on the peripheral surface of the rotary cutter have surfaces arranged at an angle that is neither parallel nor orthogonal to the end surface of the rotary cutter.

* * * * *